R. C. PURVIS.
PROTECTIVE ARMOR FOR PNEUMATIC TIRES.
APPLICATION FILED JUNE 27, 1917.
1,299,225.
Patented Apr. 1, 1919.
2 SHEETS—SHEET 2.
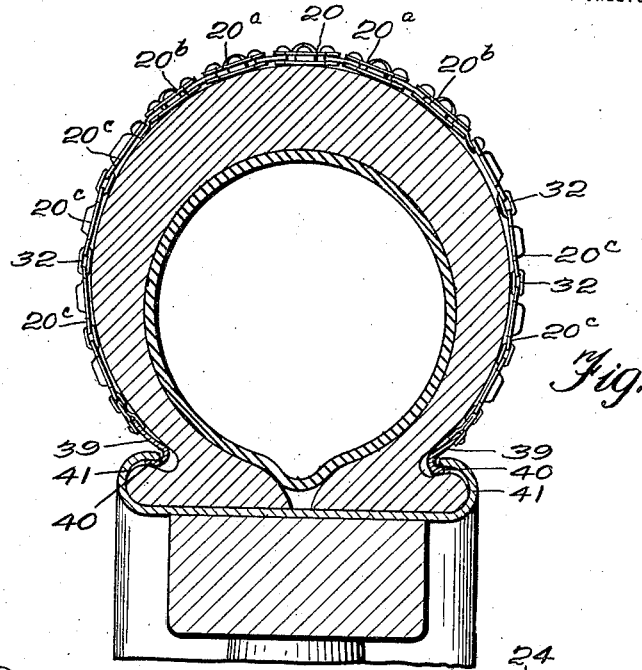
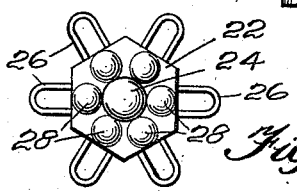
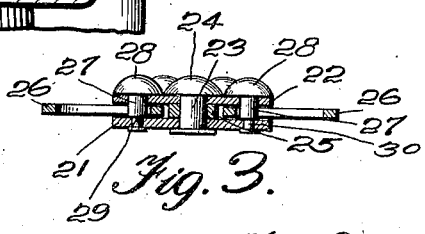
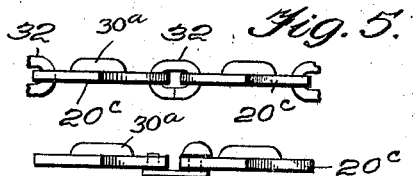
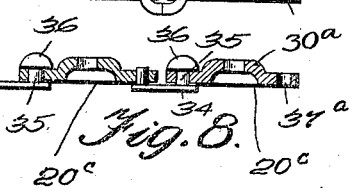
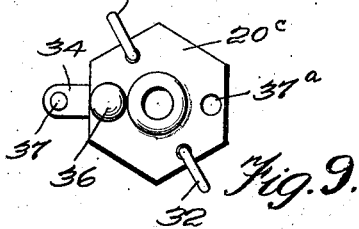
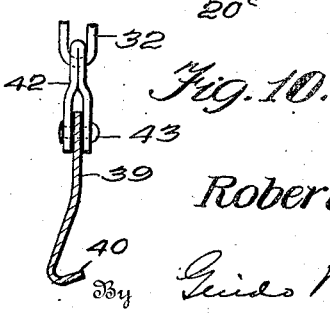
Witness
J. M. Lyles
Inventor
Robert C. Purvis,
By Guido M. Sacerdote
his Attorney

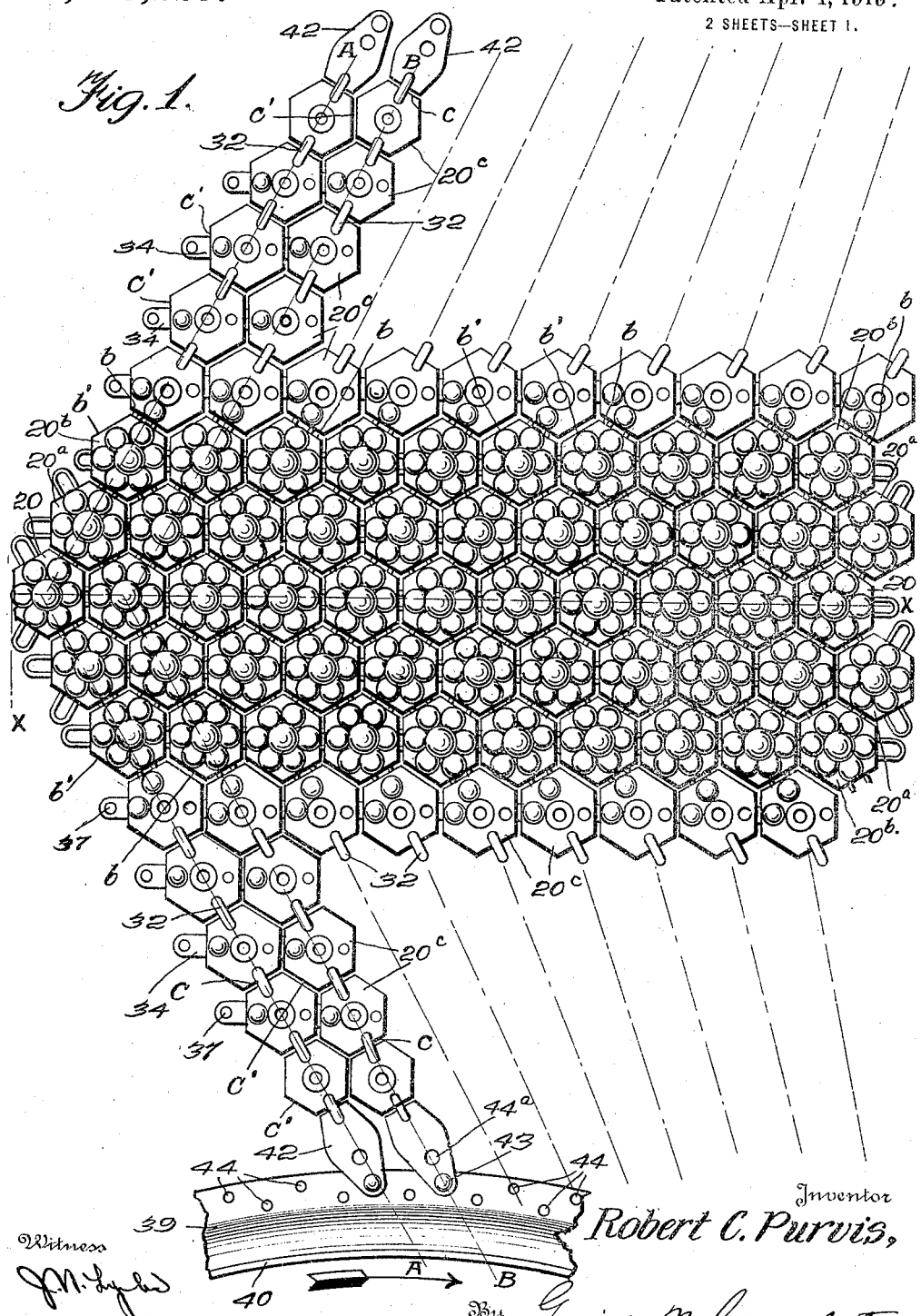

UNITED STATES PATENT OFFICE.

ROBERT C. PURVIS, OF SEAFORD, DELAWARE.

PROTECTIVE ARMOR FOR PNEUMATIC TIRES.

1,299,225.  Specification of Letters Patent.  Patented Apr. 1, 1919.

Continuation of application Serial No. 850,476, filed July 11, 1914. This application filed June 27, 1917. Serial No. 177,200.

*To all whom it may concern:*

Be it known that I, ROBERT C. PURVIS, a citizen of the United States, and resident of Seaford, in the county of Sussex and State of Delaware, have invented a new and useful Improvement in Protective Armors for Pneumatic Tires, which improvement is fully set forth in the following specification.

This invention relates to armor for resilient tires, such as automobile tires, and more particularly to armor formed by a plurality of closely abutting hexagonal disks, the general construction resembling, in some respects, that described and claimed in my Patent No. 1,112,030 for armors for pneumatic tires. While the present improvements are more particularly adapted for embodiment in armor of this general character, nevertheless they are in themselves novel and their use is not necessarily limited in all cases to the particular type of armor above referred to.

One of the objects of this invention is to provide an improved and novel tire armor construction of such character that the armor can be readily altered in size, if necessary, to insure its hugging the tire closely, this latter being absolutely essential for the proper working of devices of this class. Said armor is so constructed furthermore that the tractive effect secured by its use is considerably increased over that attainable with other types of armor heretofore proposed; while at the same time injury to the road is avoided.

Another object of this invention is to provide a special construction of armor elements or disks, and also a novel method of connecting or linking the disks together to form a complete armor in such manner as to protect the connecting links from contact with the road. The armor is thus rendered practically indestructible because no substantial wear will take effect on the connecting links. The disks may be connected in this manner over the whole armor, or over any suitable portion thereof.

With these and other objects in view, such as will more fully appear as the description proceeds, this invention comprises certain novel constructions and arrangements of parts as will be hereinafter described and claimed in the appended claims.

A desirable practical construction embodying the principles of the present invention is illustrated in the accompanying drawings in which:—

Figure 1 shows a piece of armoring fabric constructed in accordance with the invention, together with means for securing the same in place on a wheel rim and tire, the fabric being represented as flattened out in a plane for convenience of illustration;

Fig. 2 is a cross sectional view of a tire with the armor applied thereto;

Figs. 3 and 4 are a section and plan view, respectively, of a disk and connecting links such as may be employed for the tread portion of the armor;

Figs. 5 and 6 are an edge view and section, respectively, illustrating how the disks comprising the oblique rows may be linked together end to end over the side portion of the armor;

Figs. 7 and 8 are, respectively, an edge view and a section showing how the oblique rows of disks may be linked together circumferentially over the side portions of the armor;

Fig. 9 is a detail plan of one of the side disks; and

Fig. 10 is a detail, partly in section, illustrating one form of marginal fastening means which may be employed.

In the present example, the armor fabric is composed of a plurality of hexagonal disks of a structure to be more fully hereinafter described. These disks are in close arrangement with their edges almost or substantially abutting and are connected together in such manner as to give the resultant assemblage enough flexibility to enable it to conform readily to the tire and to hug the same closely. For the sake of clearness in explanation, it is pointed out that the armor here illustrated may be considered to be made up of a plurality of oblique rows of connected disks extending from the opposite lateral edges of the armor and converging in pairs at the center line X—X of the armor, each pair of convergent oblique rows thus constituting a more or less flattened V, all the V's, such as A X A, B X B, etc., (indicated in dotted lines) being substantially parallel and arranged herring-bone fashion around the full circumferential extent of the armor. It is to be understood that this parallelism is only approximate and that said oblique rows converge slightly from the center-line X—X toward both margins of the armor. The armor may also be considered to be composed of substantially parallel or concentric rows of disks connected end to end and extending circumferentially or peripherally (horizontally in Fig. 1) around the tire.

As will appear later, the connection of the armor disks to each other in such manner as to facilitate ready bodily removal of any one or more of the V units A X A, etc., when it is necessary to shorten up the tire armor, forms an important part of my invention.

In Fig. 1 disks 20 are connected together in approximate end-to-end abutment to form a row extending lengthwise of the armor and substantially along the center line of its tread. Each disk in this central row has its two opposite pairs of lateral edges linked to the adjacent edges of disks 20$^a$ which are also connected end to end in two rows extending lengthwise, one on each side of the central row and parallel thereto. Outside of each row of disks 20$^a$, disks 20$^b$ are connected end to end into similar longitudinal rows; but it is to be noted that only alternate edges $b$ adjacent the disks 20$^a$ are connected to said disks, the remaining edges $b'$ adjacent disks 20$^a$ being left free as shown. This method of alternate linkage may also be employed in connecting the rows of disks 20$^a$ to the central row of disks 20; but, in practice, it is preferred to follow the method of linkage above described.

In the present example, the five rows of disks 20, 20$^a$ and 20$^b$, constitute the tread portion proper of the tire armor; and it is particularly advantageous to employ a special type of construction for the disks used in this portion of the armor as will appear later.

The lateral portions of the tire armor, that is, the portions lying on opposite sides of the tread, may be composed of longitudinal series of rows of disks 20$^c$ extending parallel to the circumferential rows of the tread portion. These disks may advantageously be of simpler construction than the tread disks. There may be as many of these lateral rows as is necessary to give the proper width to the armor; and the disks of each row are connected end to end as before. Similarly, alternate edges $c$ of the disks in each of these rows are connected to the mating edges of the disks in the row lying next in order toward the tread; the other alternate edges $c'$ being left free. As fully set forth in my prior patent aforesaid, this method of alternate linkage gives to the armor fabric as a whole a high degree of flexibility, while at the same time, assuming the drag or traction on the armor tread to be toward the left, as it will be when the wheel turns in the direction of the arrow, the parallel oblique rows of disks extending from the center of the tread toward both margins thereof, are crowded together to bring the disks into close abutment and to present an impenetrable armor surface for the protection of the tire.

It is to be noted that the disks composing the tire armor are not of uniform size, but that they decrease gradually in diameter from the tread outwardly toward both margins. Furthermore, the disks instead of being perfectly regular hexagons may advantageously, although not necessarily, have an opposite pair of sides converging slightly from the tread toward the margin of the armor, as described in my prior patent aforesaid. This graduation of size in the disks, and the described slight irregularity in the outline thereof, enables the disks to close up together more perfectly when the armor is on the tire and thus to enhance the impenetrability of the armor as a whole.

Broadly speaking, the general arrangement of parts thus far described resembles in many respects that of my prior patent. The particular features characterizing the present invention will now be described in detail.

In the armor shown in Fig. 1, the disks in the rows 20, 20$^a$ and 20$^b$, constituting the tread proper, are of special construction designed to prevent contact of the linking elements with the roadway when the armor is in use, and thus to prolong greatly the life of the armor. A suitable construction of disks 20 for this purpose is shown in Figs. 3 and 4; and the disks 20$^a$ and 20$^b$ may be similarly formed. In this construction each disk is composed of a lower plate 21, and an upper plate 22 of equal size, connected and retained in their proper relationship by a central master rivet 23 having a large head 24 projecting above plate 22. A spacing washer 25 inserted on the rivet keeps the plates 21 and 22 at the proper distance apart to permit the free movement of links 26 which connect adjoining disks, as seen in Fig. 1. The shank of the master rivet extends through both plates and is headed over on the under side to permanently secure said plates together. Said links 26 are retained by rivets 27 each having a large head 28 also projecting above the surface of plate 22. These rivets differ from the master rivets 23, however, in that they are so designed, for purposes to be explained later, that they can be rather easily driven out from the under side of the disk element by means of a suitable tool. To this end, the shank of each rivet 27 is shouldered as at 29 for abutment with the upper side of the under plate 21, while only a reduced portion 30 of said shank extends through plate 21, its lower end being upset on the under side enough to hold the rivet in place, but not enough to seriously resist removal of the rivet by means of a punch, for example. In other words, the master rivet 23 is relied upon principally to secure the disk plates together, while the rivets 27 provide pivotal anchorage for the connecting links 26. All the rivet heads are best of relatively large size so that they almost entirely cover the disk plates or a large part thereof and therefore take up most or all the contact with the road, leaving only sufficient space to prevent suction on the road, and at the same time ventilating the fabric and keeping it cool. As here shown, the outer rivet heads are substantially tangent to the central rivet head, which is the construction preferred. On account of this construction the armor is almost indestructible and the friction or traction secured is greatly increased without injury to the road. Injury to the road is, in fact, substantially eliminated as the action on the road is similar to that of a horse's foot; but it is better on account of the great number of points in constant contact with the road. Suction on the surface of the road by the rubber tire is avoided by means of this armor. Another important function of the large outer rivet heads is to prevent stones or other objects coming in contact with the outer disk plates and bending them in toward the inner plates in such manner as to pinch the links 26 and thus impair the flexibility of the fabric. In the present construction the large rivet heads take up stresses of this kind and, by virtue of the shoulders 29, transmit them to the under plates.

The life of the armor is, of course, greatly increased by the fact that the links connecting the tread elements are protected from contact with the road by the outer plates of the disks. In case of wear or breakage of one of the links the rivets 27 retaining the same can be driven out with a punch and a new link and rivets substituted by any handy person. Repairs are thereby much facilitated, since any part or number of parts can be thus treated.

In the present example, the links 26 are shown as flat and as lying each in a plane approximately parallel to one or the other of the disks connected thereby.

In order to assemble the tread portion of the fabric, each hexagonal upper plate is first connected to its corresponding lower plate by means of the central master rivet, the links 26 are then inserted between the respective pairs of plates, the rivets 27 are then passed through the upper plate and the respective links, with the reduced rivet shanks extending through the lower plates, and the lower ends are riveted over enough to hold the rivets in position.

The disks composing the tread portion of the armor are best fitted with the large headed rivets, both at points where a link connection exists and at those points such as 21, where no connection is made. At these latter points, however, it is not necessary that the rivet be a stud rivet, but it is sufficient that the rivet be inserted through the outer plate 22 only.

Since the lateral portions of the armor covering the sides of the tire are not subjected to such severe wear as is the tread portion, it is not so important to protect the connecting links in the lateral portions against abrasion. Consequently disks of simpler structures may be, and as a rule most advantageously are, employed. For use on armored cars in military service, double disk elements like those above described for the tread may be used for the entire tire armor. But in the present example the elements 20$^c$ are simply flat hexagonal disks. Each disk may be provided with a central perforated boss 30$^a$ to facilitate assembling the side disks by means of a suitable tool. The linkage of these disks may take various forms. As here shown, the oblique or diagonal linkage is accomplished by means of eye links 32 fitting loosely in holes provided in the disks. This diagonal or oblique linkage is intended to be relatively permanent in character. That is, it need not be designed to facilitate separation of the disks in an oblique row from each other. The lengthwise or circumferential linkage, however, should be of such character as to make it possible to readily disconnect the oblique rows one from another. With this end in view, I use for the lengthwise or circumferential linkage of the lateral armor portions a readily removable coupling device such, for example, as that clearly illustrated in Figs. 1, 7 and 8, for connecting adjoining elements of adjoining oblique rows. As shown, this open link or coupling comprises a flat piece 34, adapted to underlie a pair of adjacent disks or plates 20$^c$. At one end the piece 34 is pivotally but permanently secured to disk or plate 20$^c$ by means of the stud 35 which extends loosely through a hole in the plate and is headed over on the upper side thereof as at 36. The other end of the piece 34 carries the stud 37 which is adapted to enter hole 37$^a$ in the next adjacent disk 20$^c$ of the same circumferential series. When the armor is in place on the inflated tire, the pressure of the tire against the flat piece 34 holds the stud 37 in position and prevents its becoming unhooked, but disconnection can readily be effected when the tire is deflated.

It is to be understood, therefore, that the described circumferential or longitudinal linkage of the disk elements is designed and adapted to facilitate bodily removal of one or more of the V units before referred to. It is to be noted, however, that in the example given this linkage for the tread portion of the armor differs from that for the lateral portions, this being necessitated by the more severe service conditions to which the tread is subjected when the armor is in use. It would be feasible to omit altogether the circumferential linkage over the side portions of the armor if the drag on the armor were always in the same direction, that is, toward the vertices of the parallel V's. But in backing up, the direction of drag is reversed and the oblique rows tend to separate; so that the described linkage at the sides is desirable in actual practice.

After the armor has been in use for some time it becomes stretched somewhat and may cease to cling to the tire as closely as it should. When this occurs, the tire should be deflated, the armor taken off, and one of the V units, such as A X A, removed by unhooking the button links connecting it circumferentially to the adjacent V units and punching out two of the small rivet fastenings 30 from the under side of each of the tread disks comprised in the unit. Four of these rivet fastenings must be punched out of the disk at the vertex of the V. The unit can now be removed; and after punching out rivets from one or the other of the resultant free ends of the armor to release one superfluous set of circumferential links 26, the free ends of the armor can be brought together, the circumferential tread linking effected by setting new rivets 27 in that end of the armor from which the old ones were punched out, and the lateral circumferential linking effected by hooking the studs 37 of the coupling devices into place in an obvious manner. The armor is now complete again but is shorter circumferentially by an amount equal to the width of one V unit. It is to be noted especially that this change can be accomplished very easily and with the aid of only such tools as are conveniently included in an ordinary road repair kit. Provision is thus made for readily altering the size of the armor in a few moments whenever it tends to become loose on the tire, a condition which must be avoided in using tire armor of this character. In this way also, the armor may be quickly changed to fit tires and wheels of different sizes. Individual tread disks can also be easily removed and replaced when necessary. As the side disks 20ᶜ are exposed to much less wear than are the tread disks, the side disks very rarely require replacement. The links 32 which connect them in oblique rows may therefore be welded links if desired. By reason of the open links or coupling devices at the sides, portions of the armor can be lifted for inspecting the tire beneath, without removing the armor as a whole.

For securing the armor in position on a tire, any suitable means may be employed, but such means should conform to my general purpose of having the V units readily removable. In the present example the means shown is especially effective where the tire is mounted on a clencher rim, and it comprises an attaching plate 39, usually consisting of a plurality of terminally abutting sections arranged around the tire and having a hooked portion 40 adapted to engage the rim channel 41. The oblique rows of disks may be removably connected to plate 39 by means of a bifurcated plate element 42 fitting over the edge of the plate and secured thereto as by rivet 32 which, as shown, should be of such character as to be readily punched out in the manner before described. In order to provide for adjusting tension of the armor crosswise of the tire, the plate 39 may have a staggered set of holes 44 to receive the rivets 43, those holes being selected for use which give the proper tension. Another sets of rivet holes 44ª in the elements 42 enables further adjustment of the tension if necessary.

It is evident that the details of construction given above may be modified considerably while still realizing the benefits of the invention. All such changes as come fairly within the scope of the appended claims are to be understood as contemplated herein.

This application is a continuation of my prior application Serial No. 850,476, filed July 11, 1914.

What I claim is:

1. In a device of the class described, a plurality of disks, each of said disks being composed of an outer plate and an inner plate, a master rivet connecting said outer and said inner plate together so as to leave a gap between said plates, eye links inserted in said gap connecting adjoining disks, and stud rivets passing through said plates and eye links.

2. In a device of the class described and in combination with disks each composed of outer and inner flat plates, and links inserted between said plates connecting adjoining disks, means extending loosely through said links and connecting each set of plates to form a disk.

3. Tire armor comprising the combination, with a plurality of disks, of means connecting said disks to form a flexible fabric, each of said disks comprising a pair of flat plates of substantially the same size and shape secured together in spaced parallel arrangement to form a compound disk element, and said connecting means entering the space between said plates so as to be substantially concealed thereby and being secured therein.

4. Tire armor comprising in combination, a plurality of metal disks connected together in close arrangement to form a flexible protective fabric, and projecting rivet heads so grouped on the wearing faces of the disks that each disk has a centrally disposed rivet head to which the other rivet heads on that disk are substantially tangent.

5. Tire armor comprising the combination, with a plurality of pairs of rows of flexibly connected disks converging obliquely from the armor margins to form substantially V-shaped units in parallel arrangement, of separable fastening means flexibly linking said V-shaped units together circumferentially, such linking means being adapted and arranged to permit ready disconnection of any of said units from adjoining units.

6. Tire armor comprising the combination, with a plurality of pairs of flexibly connected disks converging obliquely from the armor margins to form substantially V-shaped units in parallel arrangement, of means including easily removable rivet members flexibly linking said V-shaped units together circumferentially at the tread portion of the armor, and removable open links flexibly connecting said units together circumferentially at the lateral portions of the armor.

7. Tire armor comprising in combination, compound disk tread elements each consisting of a pair of plates of the same size and shape secured together in spaced relation, connecting eye links entering between the plates of adjoining tread elements, rivets each extending through both plates of said elements and through the eye links, each of said rivets having one of its ends only slightly upset to facilitate ready removal, additional disk elements for the side portions of the armor, means linking the side disk elements to the tread disk elements, and removable hook links circumferentially connecting said side disk elements to each other.

8. In tire armor of the character described, an armor element comprising, in combination, inner and outer disks, secured together by a central rivet and spaced apart by a washer through which said central rivet extends, and additional rivets extending through both plates and shouldered for pressure-transmitting engagement with said inner disk.

9. In a tire armor of the character described, an armor element comprising, in combination, inner and outer disks secured together by a central rivet and spaced apart by a washer through which said central rivet extends, and additional rivets extending through both plates and shouldered for pressure-transmitting engagement with said inner disks, all the said rivets being provided with relatively large heads arranged to cover most of the outer face of the outer disk.

10. In tire armor of the character described, an armor element comprising, in combination, inner and outer disks secured together by a central rivet and spaced apart by a washer through which said central rivet extends, additional rivets extending through both plates and shouldered for pressure-transmitting engagement with said inner disk, and connecting links loosely held by said shouldered rivets.

11. In tire armor of the character described, the combination, with a disk, of a coupling device having a permanent pivotal connection thereto and having a free end adapted to hook into an adjacent disk.

12. In tire armor of the character described, the combination, with a disk, of a coupling device having a permanent pivotal connection thereto and having a free end adapted to hook into an adjacent disk, said coupling device having a flattened intermediate portion adapted to underlie both disks.

In witness whereof I hereinto affix my signature.

ROBERT C. PURVIS.

Copies of this patent may be obtained for five cents each, by addressing the "Commissioner of Patents, Washington, D. C."